(12) United States Patent  (10) Patent No.: US 9,393,933 B2
Straugheir  (45) Date of Patent: Jul. 19, 2016

(54) VEHICLE SECURITY

(71) Applicant: Jaguar Land Rover Limited, Coventry (GB)

(72) Inventor: Robert Straugheir, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/397,867

(22) PCT Filed: May 2, 2013

(86) PCT No.: PCT/EP2013/059128
§ 371 (c)(1),
(2) Date: Oct. 30, 2014

(87) PCT Pub. No.: WO2013/164395
PCT Pub. Date: Nov. 7, 2013

(65) Prior Publication Data
US 2015/0116099 A1  Apr. 30, 2015

(30) Foreign Application Priority Data

May 2, 2012 (GB) .................. 1207682.4
May 2, 2012 (GB) .................. 1207683.2
May 2, 2012 (GB) .................. 1207685.7

(51) Int. Cl.
*B60R 25/10*  (2013.01)
*B60R 25/23*  (2013.01)
(Continued)

(52) U.S. Cl.
CPC .............. *B60R 25/23* (2013.01); *B60L 3/0038* (2013.01); *B60L 11/14* (2013.01); *B60L 11/1818* (2013.01); *B60L 11/1825* (2013.01); *B60R 25/20* (2013.01); *B60L 2230/12* (2013.01); *B60L 2250/10* (2013.01); *B60L 2250/16* (2013.01); *B60L 2250/22* (2013.01); *B60L 2250/26* (2013.01); *B60L 2270/32* (2013.01); *B60L 2270/34* (2013.01); *B60L 2270/36* (2013.01); *Y02T 10/70* (2013.01); *Y02T 10/7005* (2013.01);
(Continued)

(58) Field of Classification Search
CPC ............ B60W 2510/244; B60L 11/1809; B60L 11/1818; B60L 11/14; B60L 11/1825; B60L 3/0038; B60R 25/23; B60R 25/20
USPC .......................................... 701/22
See application file for complete search history.

(56) References Cited

U.S. PATENT DOCUMENTS 5,061,915 A  10/1991  Murphy
5,708,308 A  1/1998  Katayama et al.
(Continued)

FOREIGN PATENT DOCUMENTS

CN  200959427 Y  10/2007
EP  2 058 916 A1  5/2009
(Continued)

OTHER PUBLICATIONS

International Search Report, PCT/EP2013/059128, Feb. 18, 2014, 4 pages.
(Continued)

*Primary Examiner* — Thomas Mullen
(74) *Attorney, Agent, or Firm* — Myers Bigel & Sibley

(57) ABSTRACT

A hybrid or electric vehicle is immobilized while connected to a charging station. Immobilization may be overridden from the driver's HMI, in order to permit drive-away in the event of a threat to the vehicle or occupants.

20 Claims, 2 Drawing Sheets

(51) Int. Cl.
  *B60L 11/18*  (2006.01)
  *B60R 25/20*  (2013.01)
  *B60L 11/14*  (2006.01)
  *B60L 3/00*  (2006.01)

(52) U.S. Cl.
  CPC .......... *Y02T10/7077* (2013.01); *Y02T 10/7088* (2013.01); *Y02T 90/121* (2013.01); *Y02T 90/128* (2013.01); *Y02T 90/14* (2013.01)

(56) References Cited

U.S. PATENT DOCUMENTS

| | | | |
|---|---|---|---|
| 5,934,918 A | | 8/1999 | Wuechner |
| 6,150,923 A | | 11/2000 | Johnson et al. |
| 2003/0117103 A1 | | 6/2003 | Lin et al. |
| 2004/0266236 A1 | | 12/2004 | Hughes |
| 2010/0188199 A1* | | 7/2010 | Tanaka ............... B60H 1/00642 340/426.1 |
| 2010/0320964 A1 | | 12/2010 | Lathrop et al. |
| 2011/0178663 A1 | | 7/2011 | Crombez |
| 2011/0205041 A1 | | 8/2011 | Totani et al. |
| 2013/0088200 A1 | | 4/2013 | Kamishima |
| 2013/0091907 A1 | | 4/2013 | Nishijima et al. |

FOREIGN PATENT DOCUMENTS

| | | |
|---|---|---|
| GB | 2 309 341 A | 7/1997 |
| JP | S59-32544 A | 2/1984 |
| JP | H08-326638 A | 12/1996 |
| JP | 2003-054366 A | 2/2003 |
| JP | 2004-314859 A | 11/2004 |
| JP | 2005-112161 A | 4/2005 |
| JP | 2010140451 A | 6/2010 |
| JP | 2012-011876 A | 1/2012 |
| JP | 2012-018912 A | 1/2012 |
| WO | WO 2012/020306 A1 | 2/2012 |
| WO | WO 2012/034638 A1 | 3/2012 |

OTHER PUBLICATIONS

Combined Search and Examination Report, Application No. GB1207685.7, Aug. 20, 2012, 5 pages.
Notice of Reasons for Rejection, Japanese Patent Application No. 2015-509437, Dispatched: Feb. 9, 2016, 6 pages.

* cited by examiner

VEHICLE SECURITY

RELATED APPLICATIONS

This application is a 35 U.S.C. §371 national stage application of PCT Application No. PCT/EP2013/059128, filed on May 2, 2013, which claims priority from Great Britain Patent Application Nos. 1207685.7, 1207682.4 and 1207683.2, all filed on May 2, 2012, the contents of which are incorporated herein by reference in their entireties. The above-referenced PCT International Application was published in the English language as International Publication No. WO 2013/164395 A2 on Nov. 7, 2013.

FIELD OF THE INVENTION

The present invention relates to improvements in vehicle security, and concerns in particular the prevention of vehicle theft. Aspects of the invention relate to a controller, to a method and to a vehicle.

BACKGROUND

In recent years the ability of thieves to take vehicles without consent has substantially diminished, principally due to sophisticated electronic immobilizers which rely upon the presence or insertion of an enabling device, typically an ignition 'key'. Thus without the key, drive away of a vehicle is not possible.

As a consequence vehicle theft now relies upon obtaining the ignition key, typically by confronting the vehicle driver at the vehicle. An alert driver in a stationary vehicle may be able to observe the approach of suspicious persons, and take action by driving away.

Electric vehicles, hybrid vehicles and other vehicles reliant upon a charging station are however vulnerable since the vehicle is generally adapted to be immobilized (through immobilizing the engine/motor/transmission) whilst connected to the charging station. In such circumstances the vulnerable vehicle can be both readily identified, by proximity to the charging station, and the vehicle driver is prevented from immediately driving away upon noticing a threat. Immobilization is typically provided by means of a sensor, which is provided to sense the presence of a connector of a charging lead on the vehicle. Such a sensor may be mechanical or electrical and operate to both immobilize the vehicle and enable transfer of energy via the charging lead. Vehicle immobilization is typically provided by preventing engagement of a drive condition of a transmission, but could alternatively directly disable a vehicle propulsion unit.

The connection of a charging lead to the vehicle immediately enables an engine or transmission immobilizer to prevent drive-away, and is considered to be an appropriate safety feature. Any kind of vehicle immobilizer is suitable for this purpose. A difficulty arises however that this safety feature may also render a vehicle and/or driver vulnerable to theft, since it may be possible for a thief to insert a device into vehicle charging socket for the purpose of rendering the vehicle immobile. In such circumstances the vehicle driver cannot drive away.

Therefore, in some circumstances it may be possible for a thief to change the state of the sensor and thereby disable the vehicle when not connected to a charging station. For example a thief may disable a vehicle which is parked or temporarily stopped, by shorting an electrical latch or by directly tampering with a mechanical latch.

It is against this background that the present invention has been conceived. Embodiments of the invention may provide a means of countering the theft threat of changing the state of such an immobilization system. Embodiments of the invention may also provide a means of countering a theft threat whilst a vehicle is connected to a charging station or charging point. Other aims and advantages of the invention will become apparent from the following description, claims and drawings.

SUMMARY OF THE INVENTION

Aspects of the invention are defined in the appended claims.

According to an aspect of the invention there is provided a system for overriding an immobilization command from within a vehicle, the immobilization command being associated with a detection of a connection of an electrical connector of the vehicle to an outside body, the system comprising an HMI of the vehicle and a controller configured to detect an override command made by a driver through the HMI of the vehicle and to override the immobilization command in dependence on the detection of the override command.

According to another aspect of the invention, there is provided a method of overriding an immobilization command from within a vehicle, the immobilization command being associated with a detection of a connection of an electrical connector of the vehicle to an outside body, the method comprising detecting an override command made by a driver through an HMI of the vehicle and overriding the immobilization command in dependence on the detection of the override command.

According to another aspect of the invention there is provided a method of overriding from within a vehicle an immobilization command associated with coupling of a charging lead of a hybrid or electric vehicle, the method comprising activating an override protocol from the HMI of the driver to override the immobilization command.

The override protocol may be any action or sequence of actions which result in the immobilization command being overridden. In one embodiment the protocol comprises actions of the hand and leg simultaneously, or action of both hands simultaneously. Such actions are preferably intuitively associated with engine start procedures, but include an additional movement or motion which distinguishes the override protocol.

The override protocol may require occupation of the vehicle driver's seat, for which a suitable pressure sensor may be provided, for example having a threshold mass for a seat occupant of 20 kg.

In one embodiment the protocol comprises simultaneous application of the footbrake, depression of an engine start button or equivalent thereof, and activation of a vehicle hazard warning system. The first two actions are intuitive for engine start, and the third action is not part of the normal engine start procedure, but is easily associated with a threat, and thus memorable.

The override protocol may have certain consequential effects, for example operation of the vehicle horn, flashing of vehicle headlights, locking the vehicle doors, display of an 'override' message on the vehicle HMI, contacting emergency services and/or activation of a vehicle camera system.

This aspect of the invention may be embodied in a vehicle control system associated with immobilization as a direct consequence of attachment of a charging lead, and in a vehicle so equipped. The immobilization command may issue from an electronic control unit (ECU) of the vehicle, in which a processor responds to one or more electrical signals associated with coupling of a charging lead. The ECU may be further responsive to HMI electrical signals to override immobilization.

According to another aspect of the invention there is provided an apparatus for connecting a vehicle to a charging station via a connector whereby, when connected, the vehicle is immobilized, said apparatus including a driver activated release device whereby a physical connection to the vehicle may be released on demand from within the vehicle.

It is important to appreciate that this aspect of the invention is not concerned with a break-away coupling as such. Break-away couplings are well known and provide for forced separation of mating connectors upon application of an extreme external force to the coupling. A cable connection for an electric vehicle may include such a coupling for circumstances in which a vehicle immobilizer fails to disable the vehicle propulsion unit, and the driver drives away with the cable connected.

Conventional break-away couplings are usually precisely constrained to deal with known failure modes, and may not be safe or appropriate where the physical relationship between car and charging point is somewhat variable—for example angle, distance, height etc., or where the component parts of a break-away coupling may injure a passer-by as the coupling breaks.

In embodiments of the invention the connection is deliberately released prior to drive away, and release may enable the vehicle propulsion system. In an embodiment a connector of the vehicle may be physically ejected from the vehicle. Ejection of a plug-in connector may automatically enable the vehicle propulsion unit in the same way as removing a connector at the conclusion of a charging session. The release device of the invention preferably acts non-violently and with little force.

A vehicle incorporating an embodiment of the invention may include controls at the HMI (human machine interface) of the driver for releasing the connection to the charging station. Such controls may require simultaneous actions of hand and foot. In one embodiment the vehicle driver may utilize normal engine start procedures, for example pressing a footbrake whilst depressing an engine start button, and in addition complete another action, such as activating hazard warning lights. The first two actions are intuitive for engine start, but engine start is inhibited whilst the vehicle is connected to the charging station; the final action (activating hazard lights) is not part of a normal engine start sequence, but is easily associated with a threat.

Simultaneous actions by the driver ensure that releasing of the connection to the charging station is most unlikely to be triggered accidentally. Even if triggered in error, ejection of a connector may simply require re-connection for charging to resume.

In an embodiment of the invention, the normal connection and charging functionalities are not affected. As noted above ejection of a connector may be equivalent to a normal disconnection so far as vehicle immobilization systems are concerned, so that the vehicle propulsion unit is immediately enabled upon ejection of a vehicle connector.

The HMI may include a display indicating whether a cable connector is connected or disconnected, and may give an audible signal upon change of state. In the event of deliberate release of a connector from within the vehicle, a vehicle system may automatically implement other actions, such as sounding a horn, flashing headlights, calling emergency services, locking vehicle doors, and or activating a vehicle camera system.

According to another aspect of the invention, there is provided a method of automatically disconnecting a vehicle from a connector of a charging station, and comprising the step of activating from within the vehicle a release device, whereby said connector is released on demand. The method may include the step of ejecting a connector from the vehicle and/or implementing some or all of the other actions noted above.

According to another aspect of the invention, there is provided a vehicle coupling for connection to a charging connector, said coupling being reconfigurable to prevent connection of said connector.

Such an arrangement can prevent insertion of a charging connector or a substitute thereof during normal use of the vehicle, and in particular if the usual cover flap is prised open.

The term 'coupling' is to be understood to mean those components of a vehicle which interact to couple with a charging connector or the like. Such components typically include a socket, and may also include a socket housing, a mechanical interlock or other associated part.

In one embodiment the coupling has first and second conditions which are sequentially configurable to block or to not block connection of a connector. In normal use of the vehicle, for example when the driver's seat is occupied or when the vehicle engine/motor/transmission is enabled, or when vehicle doors are locked and the engine/motor is running, the coupling will be in a blocked configuration.

In one embodiment unblocking of the coupling is only in response to a specific input or command, for example from inside the vehicle, typically from the driver's HMI (human machine interface). In this way immobilization of the vehicle due to coupling of a charging connector can only occur in conditions which are deemed suitable by the vehicle driver, for example in preparation for charging from a domestic charging station. Thus for example, the coupling is not unblocked automatically in the event that the vehicle engine/motor is not running.

In another aspect the invention comprises a vehicle incorporating the coupling of the above aspect.

The invention also provides a method of preventing coupling of a charging connector to a vehicle comprising by providing a reconfigurable coupling on the vehicle, and placing said coupling in a blocked configuration unless an unblocked condition is selected.

The blocked configuration may be the normal configuration at all times unless the unblocked condition is selected from the HMI of the driver. Accordingly for charging of the vehicle the method may include the step of placing the coupling in an unblocked configuration from the HMI of the driver. The method may further include the step of reverting to the blocked configuration in the event that a charging connector is not coupled within a pre-determined time period of, for example, 30 seconds.

The method may include the step of preventing adoption of the unblocked configuration whilst the driver's seat is occupied. A suitable pressure sensor of the driver's seat may be provided, having for example an occupant threshold of 20 kg.

According to another aspect of the invention there is provided a system for preventing an immobilization command associated with a detection of a connection of an electrical connector of the vehicle to an outside body the system comprising an HMI of the vehicle and a controller configured to detect a prevention command made by the driver through the HMI of the vehicle and to configure the electrical connector of the vehicle in dependence on the detection of the prevention command, wherein the electrical connector is configurable in a first condition to allow connection of the outside body to the electrical connector and in a second condition to prevent connection of the outside body to the electrical connector. The conditions may be configurable sequentially.

The electrical connector may have a blocking member movable with respect thereto between retracted and advanced conditions, wherein in the retracted condition the electrical connector is configured in the first condition and in the advanced condition the electrical connector is configured in the second condition. Preferably the blocking member is within a reception aperture of the electrical connector in one of the retracted and advanced conditions. The blocking member may comprise an electric actuator.

According to another aspect of the invention, there is provided a vehicle comprising a system for preventing an immobilization command as hereinbefore defined. Preferably the system is normally configured to prevent connection of a charging connector. The system may be configured to prevent connection of a charging connector whilst the vehicle engine is running. Alternatively the system may be configured to prevent connection of a charging connector whilst the vehicle propulsion system is enabled. Alternatively, the system may be configured to prevent connection of the outside body upon activation of an occupant sensor of a driver's seat. Preferably, the sensor is a pressure sensor operable to detect a seat load of greater than 20 kg.

In a preferred embodiment, the system is configured to accept connection of an electrical connector only upon command from the HMI of the driver. Alternatively, the system may be configured to permit a change of state of the system only from the HMI of the driver.

According to another aspect of the invention, there is provided a method of preventing an immobilization command associated with a detection of a connection of an electrical connector of the vehicle to an outside body the method comprising detecting a prevention command made by the driver through an HMI of the vehicle and configuring the electrical connector of the vehicle in dependence on the detection of the prevention command, wherein the electrical connector is configurable in a first condition to allow connection of the outside body to the electrical connector and in a second condition to prevent connection of the outside body to the electrical connector. Preferably the method comprises configuring the electrical connector by moving a blocking member therein between blocking and non-blocking positions.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example, features described in connection with one embodiment are applicable to all embodiments, unless such features are incompatible.

BRIEF DESCRIPTION OF DRAWINGS

An embodiment of the invention will now be described, by way of example only, with reference to the accompanying drawings, in which.

DETAILED DESCRIPTION

Figure 1:
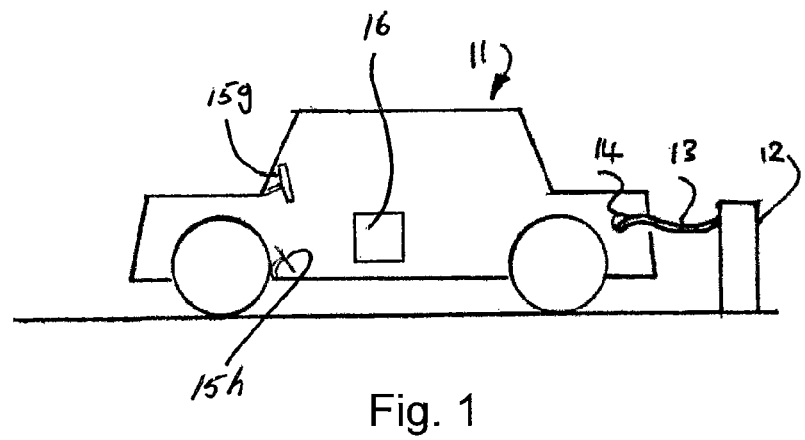
FIG. 1 shows schematically a car connected to a charging station.
Figure 2:
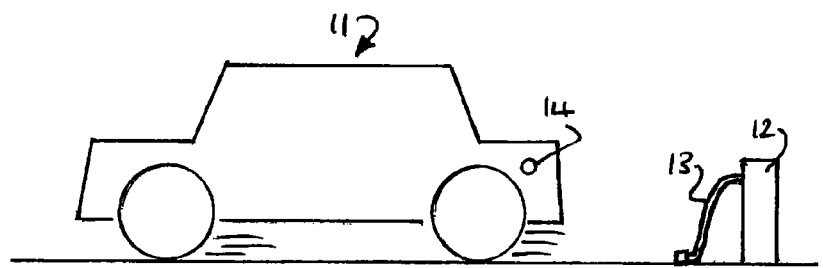
FIG. 2 illustrates schematically in partial section an exemplar electrical connector of a vehicle.

With reference to the drawings, FIGS. 1 and 2 illustrate a hybrid or electric vehicle 11 having a traction battery for propulsion thereof. In order to re-charge the battery from a distributed electrical supply, for example at home, a charging lead 13 is connected from the vehicle 11 to a charging station 12, as shown in FIG. 1. The vehicle is generally provided with a charging coupling 14 having a relatively flimsy hinged flap or cover 22 to cover the coupling to prevent tampering and to provide weather protection. The charging coupling 14 is also referred to as an electrical socket.

Figure 3:
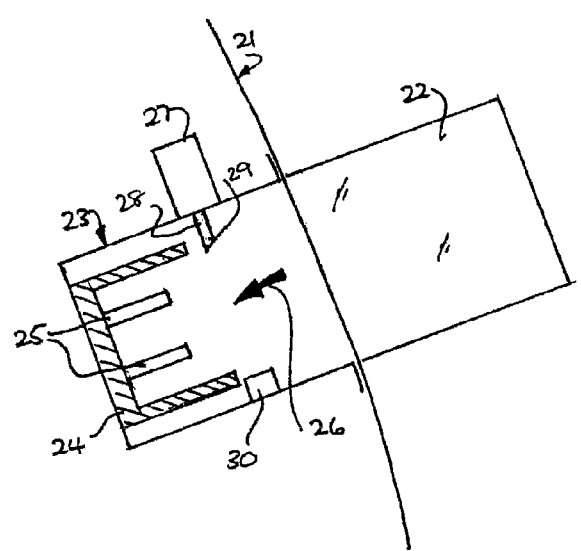
FIG. 3 illustrates schematically in partial section an electrical connector for the vehicle of FIGS. 1 and 2 according to an embodiment of the present invention.

FIG. 3 illustrates an exemplar vehicle electrical socket for receiving a charging lead. A vehicle body panel 21 has an aperture normally closed by a flap 22 (shown open). A casing 23 is defined within the aperture, and contains a socket comprising a body 24 of insulating material and electrically conductive pins 25 for completing an electrical charging circuit.

In use the flap is opened, and a suitably shaped charging connector is inserted in the direction of arrow 26. Once inserted an actuator of the coupling may retain the charging connector in place, so as to avoid inadvertent disengagement thereof. The actuator 27 includes a moving member 28 which adopts an advanced condition to engage an aperture or indent of the connector.

The actuator 27 is not essential but may be used to avoid inadvertent dislodging of the connector, and also to enable a charging circuit once the connector is safety latched; where provided it may be an essential part of the coupling in order to enable a connection protocol.

The actuator 27 adopts the advanced condition only after insertion of a connector so as to avoid damage thereto whilst a connector is inserted and is typically urged to the retracted condition by a spring or the like.

The presence of the charging connector is typically sensed by mechanical or electrical means so as to both ensure that the connector is correctly engaged, and to enable the flow of charge to the vehicle battery. Additionally the vehicle transmission and/or vehicle propulsion unit, which may comprise an internal combustion engine and/or an electric motor, is disabled so that the vehicle is immobilized. Immobilization may be required by legislation, but is in any event considered desirable to prevent drive-away whilst the charging lead is connected.

The vehicle may be unattended and locked whilst recharging, but in other circumstances the driver may be in the vehicle taking a rest break, or working. Whilst connected, the vehicle is immobilized to ensure that the vehicle cannot be driven away—this safety features provides that vehicle, connector and charging station cannot be inadvertently damaged. Any means of vehicle immobilization may be used, typically by disabling the engine or transmission of the vehicle. The vehicle propulsion system may be enabled and disabled by a physical or electrical latch associated with vehicle connection point 14, for example a proximity sensor for the cable 13, or a detent.

If the vehicle driver is in the vehicle, the vehicle is vulnerable to theft, and the vehicle driver may be confronted and challenged to hand over the ignition key.

Various kinds of presence sensors may be provided for the connector.

For example an electro-mechanical switch 27 may comprise a plunger 28 having a ramp 29 opposing entry of a connector into the socket body 24. The plunger 28 is spring loaded, and is pushed inwardly against a return spring upon passage of the connector in order to make or break an electrical circuit, and thereby to immobilize the vehicle whilst in the inward condition.

Alternatively an electrical sensor 30 may sense the proximity of a connector when inserted in the socket, and thereby give an electrical signal for immobilizing the vehicle. Such a sensor may be an inductive sensor.

In a third example the resistance of charging circuits may be sensed in order to determine coupling of the socket with a charging lead, and thereby provide an electrical signal for immobilizing the vehicle.

Typically the electrical signal of a presence sensor will be interrogated continually in order to permit a vehicle microprocessor to enable or disable the vehicle propulsion unit. Any suitable vehicle system may be used for this purpose.

The state of a presence sensor of the kind described changes according to the presence or absence of a charging connector. It will be understood that substitutes for a charging connector may have the same effect. For example a dummy connector may cause a change of state of sensors 27, 30, and if filled with an appropriate electrical resistance may give a suitable reading to a resistance measuring circuit. A simple tool, such as a screwdriver, may be used to push back the plunger of switch 27.

Countermeasures may be adopted by the vehicle designer, but nevertheless a determined thief may be able to find a means of defeating a mechanical or electrical shield.

An embodiment of the invention thus empowers the vehicle driver to override an immobilization command in the event that the vehicle is immobilized due to tampering with the presence sensor. Such circumstances may arise if a thief forces open the cover flap and inserts an immobilizing tool or the like. Upon recognizing the threat, the vehicle driver is able to override immobilization, and drive away.

According to the invention an override protocol is activated via the HMI of the driver, for example a sequence of inputs or several simultaneous inputs. In one example the vehicle driver uses a conventional engine start procedure, for example applying the footbrake whilst depressing an engine start button, together with another action, such as activating hazard warning signals.

A microprocessor of an engine control unit may recognize these signals and for example re-enable a disabled transmission to permit drive-away. Any suitable input protocol which is specific to re-enablement may be used.

According to the invention, the physical connection between the vehicle 11 and the cable 13, or between the cable 13 and the charging station 12, can be released on demand from within the vehicle. Thus a driver can take immediate action to drive away as illustrated by FIG. 2, upon becoming aware of the approach of suspicious persons.

The means and method of releasing the connection may vary according to the physical attributes of the vehicle 11, cable 13 and charging station 12.

In one embodiment, the cable includes a plug at the vehicle end, adapted to be received by a mating socket of the vehicle. Upon connection the plug and socket may latch to prevent inadvertent disconnection. Safety systems may require that a latch be engaged prior to commencement of energy transfer.

Releasing of the connection, in one embodiment, comprises disconnection of the plug latch, and soft ejection of the plug from the socket. Ejection may be by means of a mechanical spring, which may be compressed upon initial entry of the plug into the socket. Alternatively an electrical, hydraulic or pneumatic actuator may include a push rod to urge a plug axially out of a socket against the insertion direction thereof. A plug and socket arrangement can be of any suitable kind.

As noted above, ejections may automatically override vehicle immobilization, and enable the vehicle engine/motor/transmission without further modification of vehicle control and safety systems. Thus it follows that when an immobilization command is provided, the override protocol may comprise ejecting the plug. The ejection mechanism may comprise a retro-fit for a vehicle having a latch to retain a charging connector.

Release of the charging connector from within the vehicle may be recognized as an emergency, and may trigger other systems, such as for example flashing headlights, sounding the vehicle horn, alerting emergency services, locking the vehicle doors and/or activating a vehicle camera system.

The means of releasing the connection on demand from within the vehicle are many and various, and depend to some extent on the configuration of vehicle electrical and safety systems. Numerous possible solutions fall within the scope of the appended claims.

The coupling 14 may take any suitable form, but generally has a male/female relationship with a connector of a coupling lead. This lead, which is often carried in the vehicle, is connected between the vehicle and a charging station when required.

In one embodiment of the invention, the coupling is reconfigured to prevent insertion of a plug into the socket body 24, by providing a suitable barrier. The actuator 27 may be utilized to provide such a barrier, if advanced at times when charging of the vehicle is not required or is not possible—for example because the vehicle is in use.

Thus the actuator 27 may have a dual purpose in this embodiment, and is advanced unless retracted for imminent connection or disconnection of a charging lead. The moving member of the actuator either blocks entry of a plug into the socket 24, or latches a plug within the socket.

In one alternative embodiment, a blocking member may be provided within the socket, and for example project in the region of the pins 25 to prevent insertion of the connector of a charging lead.

Many different configurations will be apparent, some of which provide for blocking independent of a latching actuator, such as actuator 27, and some of which combine the functions of blocking and latching.

Figure 4:
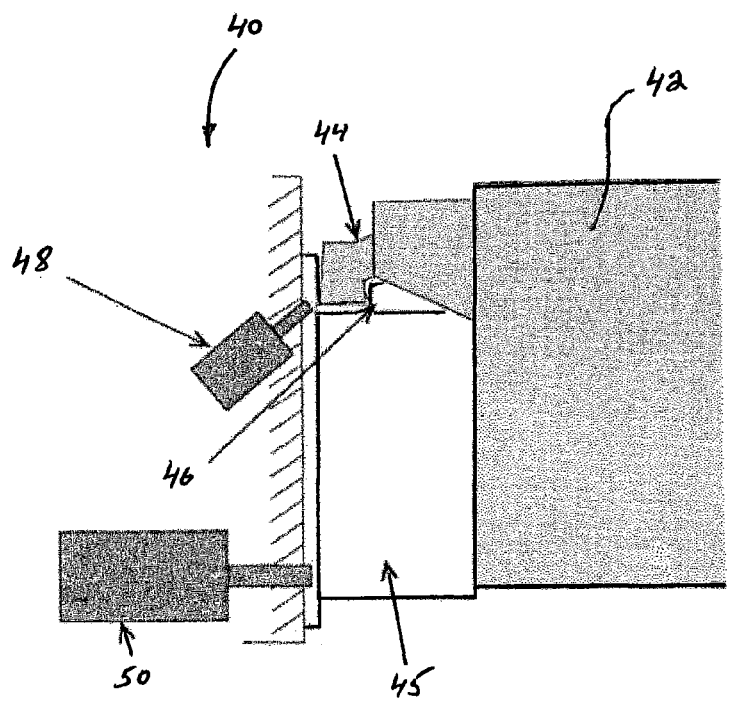
FIG. 4 illustrates schematically in partial section an electrical connector according to an embodiment of the invention and a plug attached thereto.

FIG. 4 illustrates a connector 40 according to any of the above embodiments of the invention when connected to a plug 42 comprising a latch 44. In normal operation, the latch 44 is configured to latch over a notch 46 on a surface 45 of the connector 40 or proximal thereto. In embodiments of the invention whereby the plug/outside body is released from the connector, a latch release actuator 48 is used to release the latch as part of releasing the plug. An ejector 50 may also take the form of an actuator and may be used to eject the plug as previously discussed.

Figure 5:
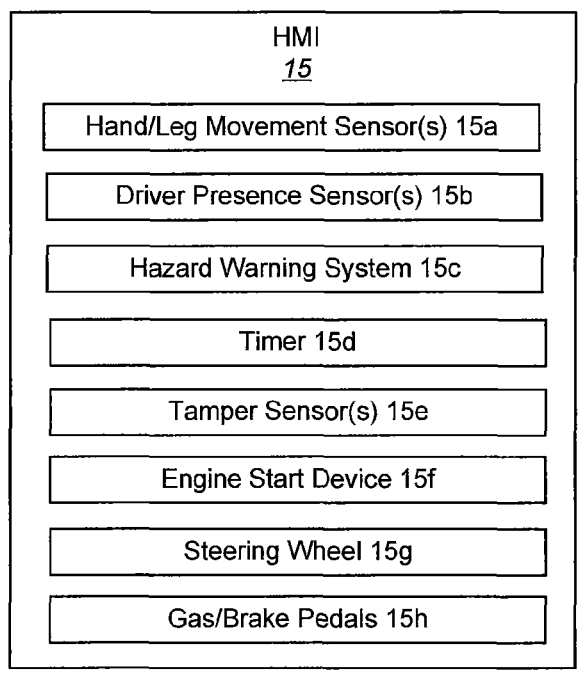
FIG. 5 illustrates an HMI, according to some embodiments of the present invention.

As shown in FIG. 1, in embodiments according to the invention, there is a system comprising an HMI 15 of the vehicle and a controller 16. FIG. 5 illustrates the HMI 15 in greater detail and which includes, but is not limited to, one or more hand/leg movement sensors 15a, one or more driver presence sensors 15b, a hazard warning system 15c, a timer 15d configured to measure a time period, a tamper sensor 15e, and/or an engine start device 15f. In addition, the steering wheel 15g (FIG. 1) and the gas/brake pedals 15h (FIG. 1) may be considered part of the HMI 15. The controller is configured to detect an override command made by a driver through the HMI of the vehicle and to override the immobilization command in dependence on the detection of the override command. In some examples the controller may only permit overriding of the immobilization command within a predefined time limit since the immobilization command was made. For example, the override may be available for 20 seconds after the immobilization command was made. Other time limits are suitable. This has the advantage that the system allows for vehicle override in circumstances where the vehicle is tampered with while temporarily stationary, for example at traffic lights.

In some examples of the invention, the controller may permit overriding the immobilization command if it is determined that the connector has been tampered with. This could be through, for example, providing a sensor on the cover 22 (see FIG. 3) to detect forced removal of the cover. In the event that tampering had been detected, the override function would be enabled.

It should be appreciated that elements of the foregoing examples may be used in conjunction with each other. For example, the controller may be used to control the features of the foregoing examples. Furthermore, the controller may perform the method of overriding the immobilization command or preventing access to the charging connector. It should also be noted that the override protocol is also referred to as an override command made by the driver.

The invention claimed is:

1. A system for overriding an immobilization command from within a vehicle, the immobilization command being associated with a detection of a connection of an electrical connector of the vehicle to an outside body, the system comprising:
   an HMI (human machine interface) of the vehicle; and
   a controller configured to detect an override command made by a driver through the HMI and to override the immobilization command in dependence on detection of the override command.

2. The system of claim 1, further comprising a release device whereby the outside body may be released on demand from within the vehicle and/or an ejection device whereby the outside body may be ejected on demand from within the vehicle.

3. The system of claim 2, wherein the system includes the ejection device, and wherein the ejection device comprises an actuator adapted to urge the outside body from the vehicle.

4. The system of claim 2, wherein the system includes the release device, and wherein the release device comprises a latch release actuator for releasing a latch of the outside body.

5. The system of claim 1, wherein the HMI comprises a hand movement sensor configured to detect movement of a hand of the driver and/or a leg movement sensor configured to detect movement of a leg of the driver.

6. The system of claim 5, wherein the HMI comprises a driver presence sensor configured to detect a presence of the driver in a driving seat of the vehicle.

7. The system of claim 1, wherein the controller is configured to activate a hazard warning system of the vehicle in dependence on detection of the override command.

8. The system of claim 1, further comprising a timer configured to measure a time period since an immobilization command was made, the controller configured to override the immobilization command in dependence on detection of the override command only until a predetermined time period has elapsed.

9. The system of claim 1, further comprising a tamper sensor for detecting tampering with a cover of the electrical connector of the vehicle, the controller configured to override the immobilization command in dependence on detection of the override command only when the tamper sensor has detected tampering with the cover.

10. A vehicle comprising the system of claim 1.

11. A method of overriding an immobilization command from within a vehicle, the immobilization command being associated with a detection of a connection of an electrical connector of the vehicle to an outside body, the method comprising:
   detecting an override command made by a driver through an HMI (human machine interface) of the vehicle; and
   overriding the immobilization command in dependence on detecting the override command.

12. The method of claim 11, further comprising releasing the outside body from the electrical connector.

13. The method of claim 12, further comprising ejecting the outside body from the electrical connector.

14. The method of claim 13, wherein the releasing of the outside body comprises releasing a latch of the outside body adapted to ensure connection of the outside body with the electrical connector.

15. The method of claim 11, wherein detecting the override command comprises detecting a sequence of simultaneous hand and/or leg movements of the driver.

16. The method of claim 11, wherein detecting the override command comprises detecting a presence of the driver in a driving seat of the vehicle.

17. The method of claim 11, wherein detecting the override command comprises detecting activation of a footbrake of the vehicle and activation of an engine start device of the vehicle.

18. The method of claim 11, further comprising activating a hazard warning system.

19. The method of claim 11, further comprising measuring a time period since the immobilization command was made, and activating an override protocol of the overriding the immobilization command in dependence on detecting the override command only until a predetermined time period has elapsed.

20. The method of claim 11, further comprising detecting tampering with a cover positioned over the electrical connector of the vehicle, and activating the override protocol in dependence on detecting the override command only when tampering has been detected.

* * * * *